US008750505B2

(12) United States Patent
Choo et al.

(10) Patent No.: US 8,750,505 B2
(45) Date of Patent: Jun. 10, 2014

(54) APPARATUS AND METHOD FOR CONTROLLING CONVERSION OF BROADCASTING PROGRAM BASED ON PROGRAM PROTECTION INFORMATION

(75) Inventors: Hyon-Gon Choo, Daejeon (KR); Jeho Nam, Seoul (KR); Sangwoo Ahn, Daejeon (KR); Jooyoung Lee, Seoul (KR); Moon-Kyun Oh, Daejeon (KR); Jin-Woo Hong, Daejeon (KR); Won-Sik Cheong, Daejeon (KR); Sang-Kwon Shin, Daejeon (KR); Keunsik Lee, Seoul (KR); Byung-Sun Kim, Gyeonggi-do (KR); Hee-Young Jun, Seoul (KR); Sang-Gyou Lee, Seoul (KR); Sang-Jin Kim, Seoul (KR); Sung-Jun Ahn, Seoul (KR); Sung-Hwan Park, Seoul (KR); Jooho Song, Seoul (KR)

(73) Assignees: Electronics and Telecommunications Research Institute, Daejon (KR); Korean Broadcasting System, Seoul (KR); Munhwa Broadcasting Corporation, Seoul (KR); Seoul Broadcasting System Co., Ltd., Seoul (KR); Korea Educational Broadcasting System, Seoul (KR)

( * ) Notice: Subject to any disclaimer, the term of this patent is extended or adjusted under 35 U.S.C. 154(b) by 132 days.

(21) Appl. No.: 13/125,778

(22) PCT Filed: Oct. 21, 2009

(86) PCT No.: PCT/KR2009/006097
§ 371 (c)(1),
(2), (4) Date: Jul. 6, 2011

(87) PCT Pub. No.: WO2010/047532
PCT Pub. Date: Apr. 29, 2010

(65) Prior Publication Data
US 2011/0261254 A1 Oct. 27, 2011

(30) Foreign Application Priority Data

Oct. 22, 2008 (KR) .................. 10-2008-0103862
Feb. 17, 2009 (KR) .................. 10-2009-0013005

(51) Int. Cl.
*H04L 9/00* (2006.01)
(52) U.S. Cl.
USPC ............ 380/201; 380/202; 380/203; 380/204
(58) Field of Classification Search
USPC ............................. 380/201–204; 705/57–58
See application file for complete search history.

(56) References Cited

U.S. PATENT DOCUMENTS

2003/0234890 A1* 12/2003 Bae et al. .................. 348/469
2006/0064716 A1* 3/2006 Sull et al. .................. 725/37

(Continued)

FOREIGN PATENT DOCUMENTS

EP 1748585 A2 1/2007
EP 1819169 A2 8/2007

(Continued)

OTHER PUBLICATIONS

International Search Report for Application No. PCT/KR2009/006097, dated Feb. 9, 2011.

*Primary Examiner* — Ghazal Shehni
(74) *Attorney, Agent, or Firm* — Nelson Mullins Riley & Scarborough LLP (57) ABSTRACT

Provided are an apparatus and method for controlling program conversion according to program protection information. The method for controlling conversion of a broadcasting program includes: demultiplexing a broadcasting program into broadcasting program data and program protection information; encrypting the broadcasting program data based on distribution condition of the program protection information when recordation of the broadcasting program data is requested; and recording the encrypted broadcasting program data.

15 Claims, 9 Drawing Sheets

(56) References Cited

U.S. PATENT DOCUMENTS

| | | |
|---|---|---|
| 2006/0117379 A1* | 6/2006 | Bennett et al. .................... 726/3 |
| 2006/0206916 A1 | 9/2006 | Maeda et al. |
| 2006/0235797 A1 | 10/2006 | Lee et al. |
| 2007/0008402 A1 | 1/2007 | Ahn et al. |
| 2008/0005505 A1* | 1/2008 | Maegawa ...................... 711/156 |
| 2008/0310819 A1* | 12/2008 | Akiyama et al. ................ 386/94 |

FOREIGN PATENT DOCUMENTS

| | | |
|---|---|---|
| JP | 3768760 | 4/2006 |
| KR | 10-0611105 | 8/2006 |
| KR | 1020060109245 | 10/2006 |
| KR | 10-0708159 | 4/2007 |
| KR | 10-2008-0051043 | 6/2008 |
| KR | 1020080083874 | 9/2008 |

* cited by examiner

APPARATUS AND METHOD FOR CONTROLLING CONVERSION OF BROADCASTING PROGRAM BASED ON PROGRAM PROTECTION INFORMATION

This application is a 35 U.S.C. §371 national stage filing of PCT Application No. PCT/KR2009/006097 filed on Oct. 21, 2009, which claims priority to, and the benefit of, Korean Patent Application No. 10-2008-0103862 filed Oct. 22, 2008 and Korean Patent Application No. 10-2009-0013005 filed Feb. 17, 2009. The contents of the aforementioned applications are hereby incorporated by reference.

TECHNICAL FIELD

The present invention relates to an apparatus and method for converting a digital broadcasting program; and, more particularly, to an apparatus and method for controlling conversion of a broadcasting program based on program protection information inserted in the broadcasting program.

BACKGROUND ART

Until a recent date, broadcasting is a service that distributes analog audio and/or video signals through airwaves. This analog broadcasting service has beenchanging to a digital broadcasting service thanks to the rapid development of technology. Thus, advanced countries, e.g., United States of America and the like, are already servicing digital broadcasting. The digital broadcasting is now serviced in part of Korea and will be provided to audience in all over the country in 2012. The digital broadcasting is popularized fast because it has the advantage of providing high-definition and multi-channel environment to a viewer.

The digital broadcasting is very convenient on storing, edition and distribution of a broadcasting program. At the same time, it has a problem that the unauthorized reproduction and distribution of broadcasting program are very easy. Many domestic broadcasting programs are stored illegally and distributed without notice through Internet, Peer-to-Peer (P2P), or other recording media. Especially, the broadcasting program is manufactured by Digital Versatile Disk (DVD) without notice and the DVD containing the broadcasting program is illegally distributed or sold in the foreign countries.

In general, TV broadcasting contents is known as Free-to-Air (FTA) TV because it is distributed free of charge to everybody who can receive a broadcasting signal. In the most country, digital television (DTV) broadcasting is serviced by free of charge. Though DTV broadcasting program is a professional digital content, the DTV broadcasting program is manufactured and broadcasted without a protective device unlike other digital contents that are encrypted and distributed. In the country, digital contents of digital satellite broadcasting, satellite Digital Multimedia Broadcasting (DMB) and Internet Protocol Television (IP-TV) are protected based on Conditional Access System (CAS), Digital Rights Management (DRM), and the like.

However, a terrestrial DTV broadcasting content is not encrypted and transmitted by a form that everyone can see. The DTV broadcasting contents can easily be copied keeping original quality. A lot of the DTV broadcasting contents can instantly be distributed in all over the world through a computer linked to the Internet. When the DTV broadcasting content is distributed without notice, it can cause irrevocable loss to an author providing the broadcasting content. In addition, unless a DTV broadcaster obtains technology that can protect the DTV broadcasting content, a content provider does not trust the DTV broadcaster and the competitive power of the DTV broadcaster can be weakened. Accordingly, it is essential to technology that can protect the DTV contents by preventing the unauthorized redistribution of the DTV contents.

The importance of broadcasting program protection technology is getting bigger in other digital broadcasting as well as the DTV broadcasting. The broadcasting program protection technology protects author's right by preventing the unauthorized redistribution and retransmission of the broadcasting program. The broadcasting program protection technology provides a high quality broadcasting program and various digital broadcasting services to a viewer by guaranteeing viewer's fair-use of the broadcasting program. According to this trend, it is introduced a technology that controls the recording, the storing and the redistribution of the broadcasting program based on Program and System Information Protocol (PSIP) information describing copyright information of the broadcasting program through a user terminal.

A program protection signal transmitted through Redistribution Control (RC) Descriptor of Advanced Television Systems Committee (ATSC) forces the broadcasting program to be encrypted when the broadcasting program is recorded and stored in a receiver, such that distribution of the broadcasting program to outside of the receiver is limited. When a user wants reproduction to outside device, e.g., a portable multimedia player (PMP), it has difficulty in utilization of the broadcasting program. Accordingly, it is required an apparatus and method that can protect broadcasting contents, while solving the above problem.

DISCLOSURE OF INVENTION

Technical Problem

An embodiment of the present invention is directed to provide an apparatus and method for controlling conversion of a broadcasting program based on program protection information inserted in the broadcasting program.

Another embodiment of the present invention is directed to provide an apparatus and method for preventing the unauthorized redistribution of a broadcasting program by allowing the program protection information to be included in the broadcasting program.

Another embodiment of the present invention is directed to provide an apparatus and method for preventing the unnecessary restriction on use of a broadcasting program due to the program protection information included in the broadcasting program.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Solution to Problem

In accordance with an aspect of the present invention, there is provided a method for controlling conversion of a broadcasting program based on program protection information in a receiver of the broadcasting program, the method including: demultiplexing a broadcasting program into broadcasting program data and program protection information; encrypting the broadcasting program data based on distribution condition of the program protection information when recordation of the broadcasting program data is requested; and recording the encrypted broadcasting program data.

In accordance with another aspect of the present invention, there is provided an apparatus for controlling conversion of a broadcasting program based on program protection information, including: a demultiplexer configured to demultiplex the broadcasting program into broadcasting program data and program protection information; a storage configured to encrypt and record the broadcasting program data based on the program protection information, thereby generating a recorded broadcasting program; and a transcoder configured to convert and re-output the recorded broadcasting program based on the program protection information.

Advantageous Effects of Invention

An apparatus and method for controlling conversion of a broadcasting program prevents the broadcasting program from being illegally copied by an unauthorized user based on the program protection information inserted in broadcasting program, without unnecessary restriction on use of the broadcasting program.

BEST MODE FOR CARRYING OUT THE INVENTION

The advantages, features and aspects of the invention will become apparent from the following description of the embodiments with reference to the accompanying drawings, which is set forth hereinafter.

Figure 1:
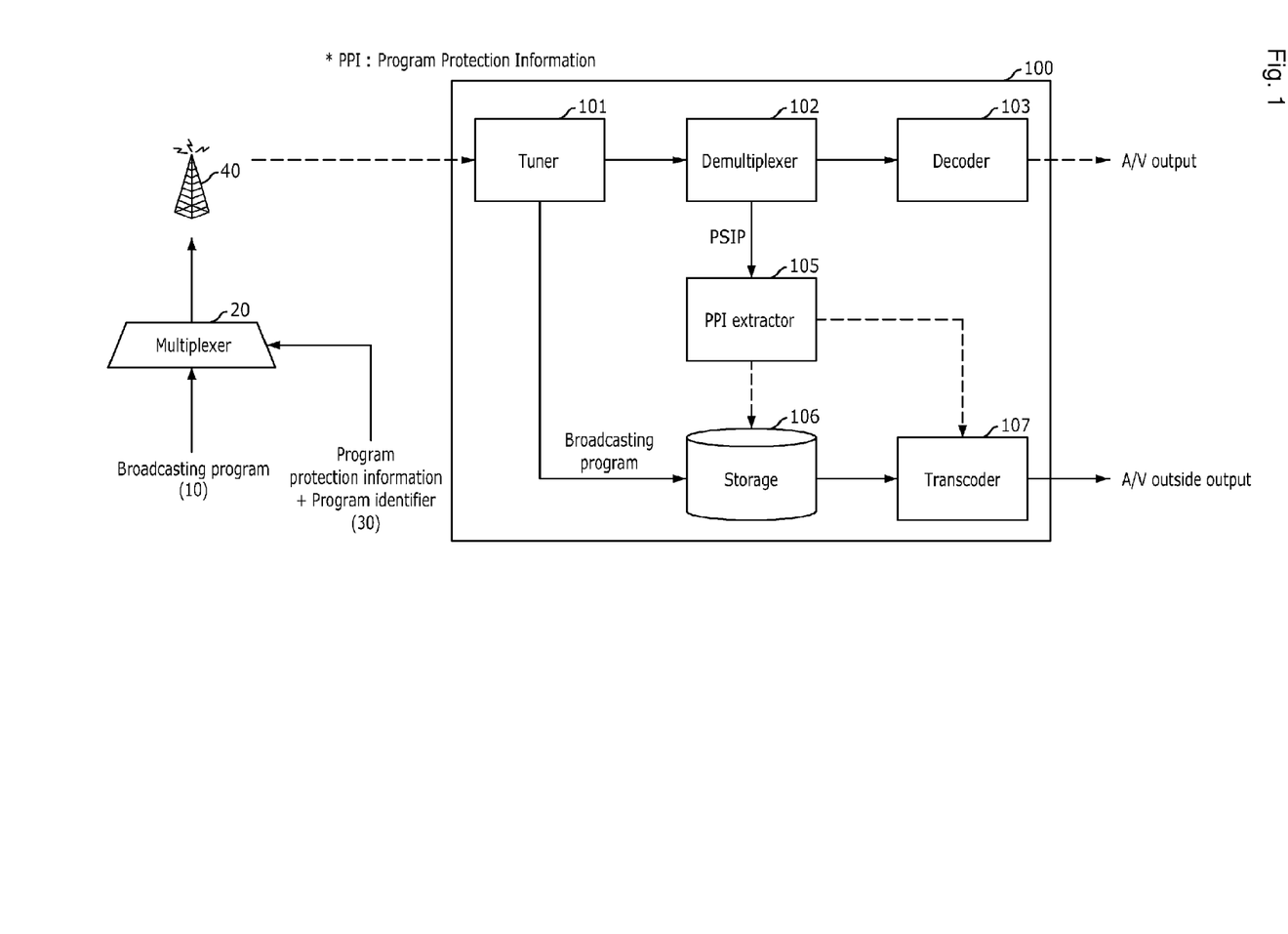
FIG. 1 is a block diagram illustrating a broadcasting signal reception apparatus in accordance with an embodiment of the present invention.

FIG. 1 is a block diagram illustrating a broadcasting signal reception apparatus in accordance with an embodiment of the present invention and a conceptual diagram illustrating a transmission unit.

First, a transmission unit for transmitting a broadcasting signal includes a multiplexer 20 and a transmitter 40. The multiplexer 20 multiplexes a broadcasting program 10 together with program protection information and a program identifier 30, thereby generating a broadcasting signal. The transmitter 40 transmits the broadcasting signal. The broadcasting signal is transmitted through various methods, e.g., a broadcasting station, a relay or a satellite.

The transmitted broadcasting signal is received to a receiver 100. The receiver 100 includes a tuner 101, a demultiplexer (Demux) 102, a decoder 103, a Program Protection Information (PPI) extractor 105, a storage 106 and a transcoder 107. The PPI extractor 105 may be implemented in the demultiplexer 102 or may be implemented along with a module for processing other information of the Program and System Information Protocol (PSPI), e.g., a PSIP processing module (not shown in FIG. 1).

In this embodiment of the present invention, the storage 106 has encryption function. That is, it is determined whether or not the broadcasting program is encrypted based on information inputted from PPI extractor 105, if the broadcasting program should be encrypted, the storage 106 encrypts the broadcasting program and records (or stores) the encrypted broadcasting program. The recording or the storing is used as the same meaning in following description. Therefore, the storage 106 as shown in FIG. 1 is not a simple recording media such as a hard disk. The storage 106 is a storage medium that is able to determine encryption and if necessary, executes the encryption when the broadcasting program is stored. In addition, the storage 106 can be implemented as a separate module in the receiver 100. As shown in FIG. 1, the transcoder 107 has a format conversion module (not shown) of the broadcasting program and a built-in counter (not shown) for time confirmation.

A broadcasting station multiplexes Program Protection Information (PPI) and transmits the broadcasting program. The tuner 101 of the receiver 100 receives the broadcasting program and transfers the inputted broadcasting program to the demultiplexer 102. When PSIP/PSI information is updated newly, the demultiplexer 102 transfers the updated PSIP/PSI information to the PPI extractor 105. The PPI extractor 105 extracts program protection information included in the PSIP/PSI information.

In case of the ATSC digital broadcasting format standardized by Advanced Television System Committee (ATSC), there is a table containing the additional information of the broadcasting program in PSIP. The PSIP is multiplexed into MPEG-2 format. The PSIP is configuration information on Transport Stream (TS) transmitted on the digital broadcasting and a set of layered tables. That is, the PSIP is standardized in ATSC to describe a system and program organization information, and the like. Redistribution control (RC) Descriptor is one of tables to include additional information in the PSIP and a table to transmit information for preventing redistribution of the broadcasting program. Configuration of the RC Descriptor is shown in a following Table 1.

TABLE 1

| Syntax | No. of Bits | Format |
|---|---|---|
| rc_descriptor( ) { | | |
| descriptor_tag | 8 | 0xAA |
| descriptor_length | 8 | uimsbf |
| for(i=0; i<descriptor_length; i++) { | | |
| rc_information( ) | 8 | uimsbf |
| } | | |
| } | | |

In the RC Descriptor as shown in Table 1, it may be included a right information and a redistribution authority information of the broadcasting program using 'rc_information( )'. The program protection information may be transmitted to be included in broadcasting program as 'rc_information( )'. The program protection information is described as a following Table 2.

TABLE 2

| Syntax | No. of Bits | Format |
|---|---|---|
| program_protection_information( ) { | | |
| version | 8 | uimsbf |
| redistribution_control_code | 2 | uimsbf |
| if( redistribution_control_code == '01') { | | |
| allowed_max_resolution | 2 | uimsbf |
| holdback_time | 3 | uimsbf |
| allowed_length | 3 | uimsbf |
| } | | |
| redistribution_area | 1 | uimsbf |
| reserved | 5 | bslbf |
| ppi_signature | 320 | uimsbf |
| } | | |

In the above Table 2, a part defined in 'if (redistribution_control_code=='01') { }' is referred to as 'redistribution_condition'. The program protection information indicated in above Table 2 is one embodiment that is included in RC Descriptor and transmitted. The program protection information may be followed by the transmission and reception standard of program protection information for territorial broadcasting in the Telecommunications Technology Association (TTA).

A territorial DTV receiver extracts the program protection information like above Table 1 and 2 of the PSIP that is received during reception of the broadcasting program, and should keep the latest program protection information. When a user selects recording, if the current Redistribution_control_code value of the program protection information is not '11', the storage 106 encrypts and stores the broadcasting program. The program protection information may be packaged and stored with additional information such as device information, and the like, at storing time.

Figure 2:
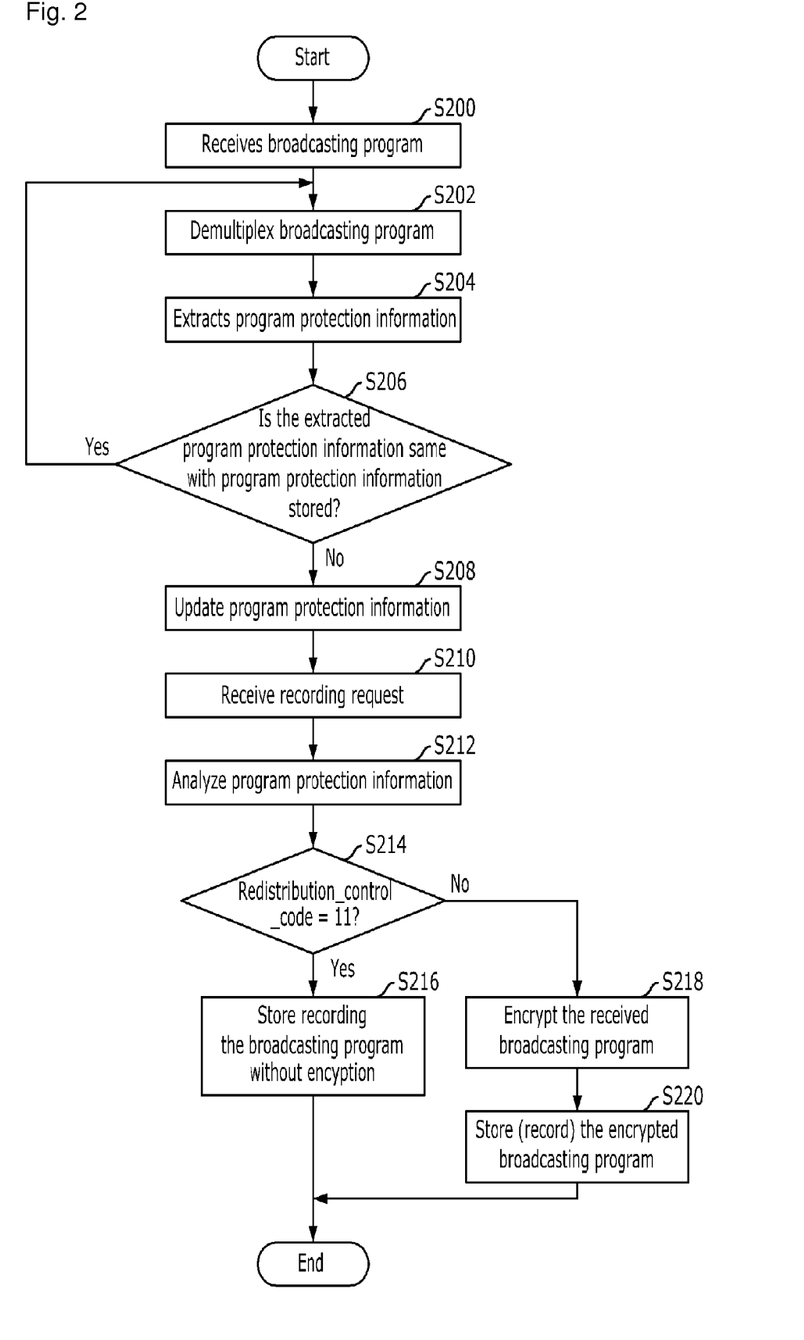
FIG. 2 is a flowchart describing receiving and recording broadcasting program according to program protection information in a receiver in accordance with an embodiment of the present invention.

FIG. 2 is a flowchart describing receiving and recording broadcasting program based on program protection information in a receiver in accordance with an embodiment of the present invention.

First, a receiver 100 receives broadcasting program through a tuner 101 at step S200. Then, the tuner 101 provides the broadcasting program to a demultiplexer 102 and a storage 106. The demultiplexer 102 demultiplexes the broadcasting program at step S202 and provides the desired broadcasting program to a decoder 103. The demultiplexer 102 provides a separate control signal to a PPI extractor 105. The PPI extractor 105 extracts program protection information from the broadcasting program at step S204. The PPI extractor 105 proceeds to step S206 and compares the extracted program protection information with program protection information stored. If two protection information are the same, the PPI extractor 105 proceeds to step S202 and performs demultiplexing. On the other hand, if two protection information are not the same, the PPI extractor 105 updates program protection information at step S208.

In addition, if the receiver 100 is required recording function, the receiver 100 inputs a recording signal into the storage 106. A step S210 in FIG. 2 would show the case that a request signal for recording is received from a user. That is, it is shown a proceeding that recording of current received broadcasting program data is requested by the user through a user interface. Then, the storage 106 analyzes the updated program protection information to the PPI extractor 105 at step S212. The storage proceeds to step S214 and inspects whether value of redistribution_control_code is "11" or not. In above inspection result, when value of redistribution_control_code is "11", the storage 106 stores the broadcasting program without encryption at step S216. The other side, when value of redistribution_control_code is not set "11, the storage 106 proceeds at step S218. The storage 106 encrypts the broadcasting program at step S218 and stores (records) the encrypted broadcasting program at step S220.

When a user tries to convert the recorded broadcasting program to move or copy to other apparatus, the receiver 100 checks the PPI information of the recorded broadcasting program again.

Here, when the value of redistribution_control_code is '00', conversion of the broadcasting program is not supported. When the value of Redistribution_control_code is '11', the broadcasting program can be freely converted. In this case, according to condition that a user wants, a transponder 107 regulates picture quality, size, length and the like of the broadcasting program to generate a converted broadcasting program. Reproduction and distribution of the converted broadcasting program are available.

In addition, when the value of Redistribution_control_code is '01', i.e., neither '00' nor '11', the PPI extractor 105 analyzes three kind of values corresponding to Redistribution_condition in above Table 2 before converting the broadcasting program.

In above Table 2, each of three conditions mean as followings.

1. Allowed maximum resolution (AllowedMaxRes) condition: AllowedMaxRes is the allowed maximum resolution of broadcasting program at distribution thereof. The broadcasting program is outputted with the resolution equal to or lower than the maximum allowed resolution. For example, maximum resolution condition indication is shown in Table 3.

TABLE 3

| value | resolution |
|---|---|
| 00 | CIF |
| 01 | SD |
| 10 | Reserved |
| 11 | No limit |

2. Hold Back Time (HoldbackTime) condition: HoldbackTime means time that the broadcasting program is held back from being distributed. After a predetermined time from televising time of the broadcasting program (i.e., televising time + predetermined prescribed time), the broadcasting program is allowed to be distributed. An example of the holdback time condition is described in Table 4.

TABLE 4

| value | time |
|---|---|
| 000 | 24 hour |
| 001 | 48 hour |
| 010 | 1 week(24 hour × 7) |
| 011 | 4 week(24 hour × 28) |
| 100~110 | Reserved |
| 111 | No limit |

3. Allowed maximum distribution length (AllowedLength) condition: AllowedLength is an allowed maximum distribution length of broadcasting program. Distribution is allowed for a time from start of recording of the broadcasting program to a predetermined time. An example of the allowed maximum distribution length is illustrated in Table 5.

TABLE 5

| value | length(time) |
|---|---|
| 000 | 5 minutes |
| 001 | 10 minutes |
| 010 | 20 minutes |
| 011 | 30 minutes |
| 100~110 | Reserved |
| 111 | No limit |

The allowed Maximum distribution length condition in above Table 5 may be indicated by time or by length of converted file.

The above conditions mean limitation on distribution of the broadcasting program available to all terminals. Conversion of broadcasting program based on the above condition will be described hereinafter.

First, the receiver 100 confirms HoldbackTime information. When the HoldbackTime is not '111', the receiver 100 compares the recording reference time of the broadcasting program with the current time. When "recording reference time+time corresponded to Table 4" has not yet passed, conversion of the broadcasting program is limited and is not performed. Therefore, the receiver 100 notifies an error processing result to a user. An apparatus for displaying the processing result, e.g., a monitor, a cathode-ray tube (CRT) or Television (TV) is not shown in FIG. 1. An input interface for inputting a user's request is also not shown in FIG. 1.

The recording reference time is a time on which the broadcasting program is recorded. The recording reference time may be a time at which file is stored or televising time information defined in broadcasting program such as MPEG-2 transport stream (TS) system time information.

Figure 3:
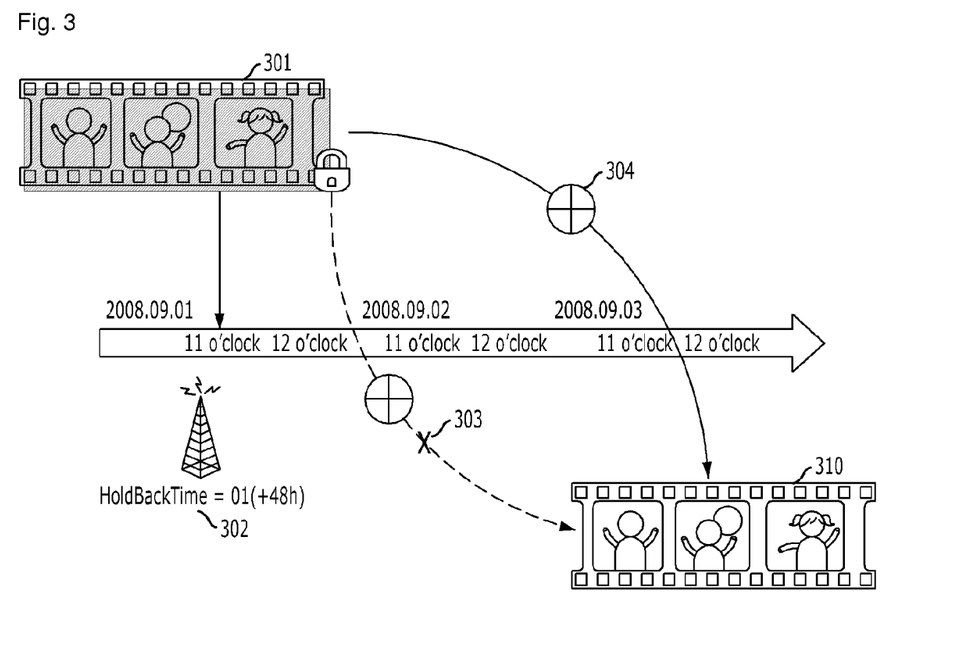
FIG. 3 is a diagram describing action control of HoldBack-Time setting in accordance with an embodiment of the present invention.

FIG. 3 is a diagram describing action control of HoldBackTime setting in accordance with an embodiment of the present invention.

With reference to FIG. 3, an example of action control of HoldBackTime setting will be described. When HoldbackTime condition 302 is given as 48 hours from the recording time of the broadcasting program 301, and the broadcasting program 301 is recorded at 11 o'clock, Sep. 1, 2008. The conversion of the broadcasting program is prohibited at Sep. 2, 2008 illustrated as reference numeral 303. However, the conversion of the broadcasting program is permitted at 12 o'clock, Sep. 3, 2008 illustrated as reference numeral 304, to generate converted broadcasting program 310.

Then, values of AllowedMaxRes and AllowedLength are inputted to the transcoder 107 of the receiver 100. If a user can select conversion condition, the maximum resolution that the user can select limits by maximum value corresponds to AllowedMaxRes. Conversion of the broadcasting program is supported as length equal to or lower than that defined in AllowedLength. Detailed description will be described referring to FIG. 4.

Figure 4:
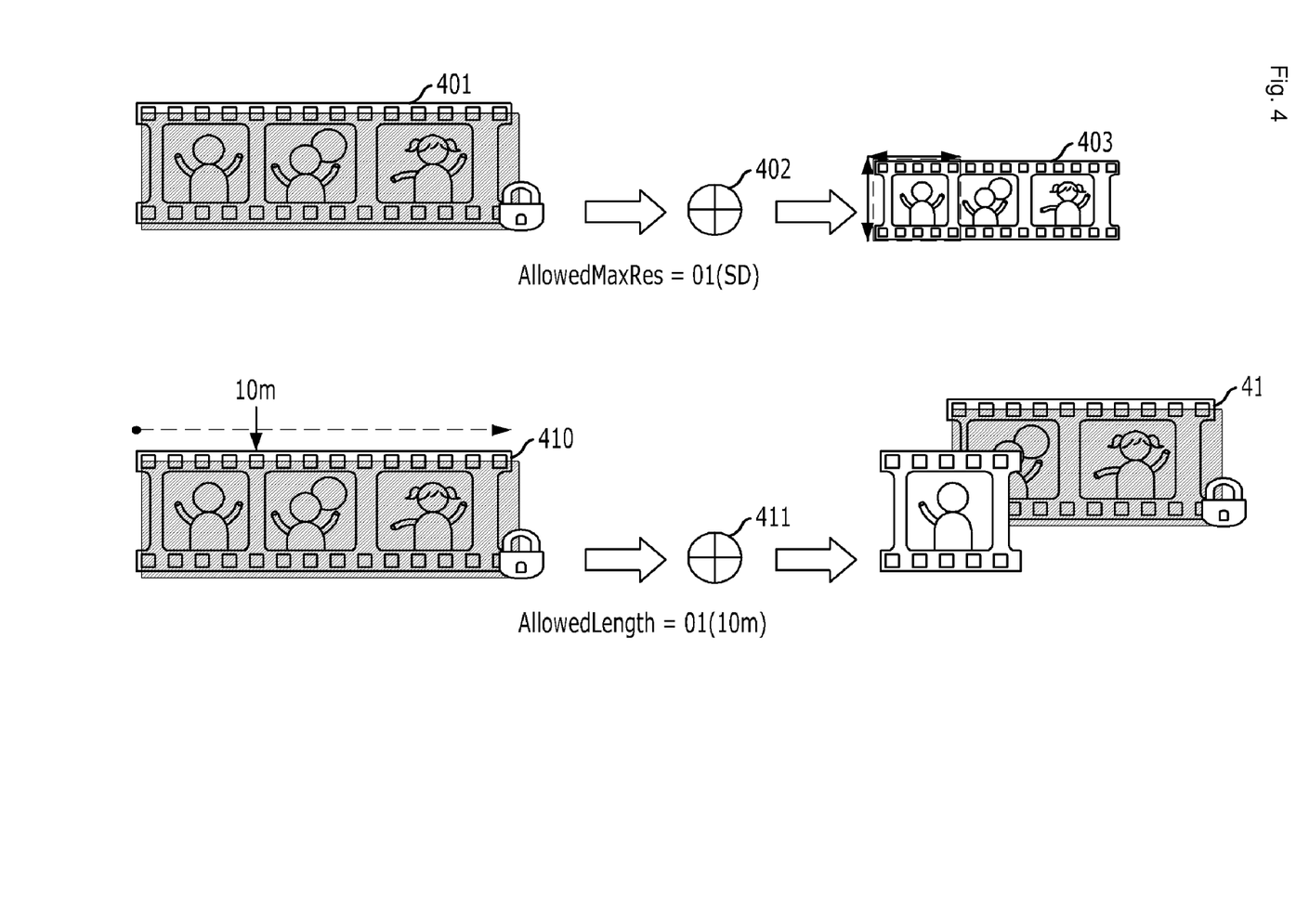
FIG. 4 is a diagram describing conversion examples of each control condition by AllowedMaxResolution and AllowedLength in accordance with an embodiment of the present invention.

FIG. 4 is diagram describing conversion examples of each control condition by AllowedMaxResolution and AllowedLength in accordance with the present invention.

In FIG. 4, the reference numeral 401 denotes the encrypted broadcasting program. Here, the broadcasting program can be converted within a permissible range AllowedMaxResolution 402 like Table 3 to a converted broadcasting program 403. For example, when the value of the AllowedMaxResolution has "01, the converted broadcasting program 403 can have a resolution below standard definition (SD) quality, not high definition (HD) quality. In addition, the reference numeral 410 denotes an example of the encrypted broadcasting program. When the value of AllowedLength is 01, for example, the transcoder 107 can decode the encrypted broadcasting program as long as time defied in AllowedLength 411, to generate decoded broadcasting program 412.

Figure 5:
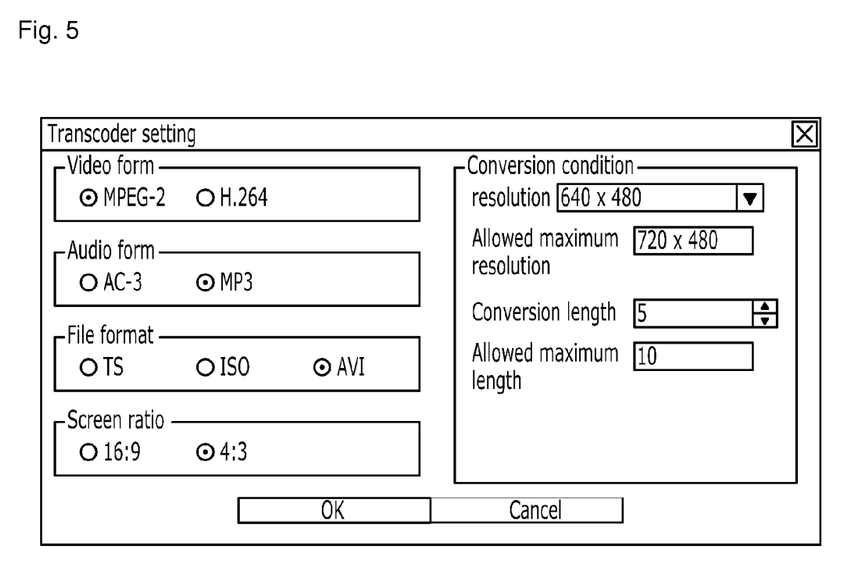
FIG. 5 is a diagram illustrating a conversion condition input window of a limitation user in accordance with an embodiment of the present invention.

Therefore, when AllowedMaxResolution and AllowedLength are established at the same time, printout of broadcasting program that satisfy both conditions should be created. For example, if a user wants conversion as shown in FIG. 5, conversion condition can be inputted from the user through a user interface. Alternatively, automatic setting values of an apparatus are inputted as conversion condition.

FIG. 5 is a diagram illustrating a conversion condition input window of a limitation user in accordance with an embodiment of the present invention.

As shown, a user or the apparatus is able to establish conversion condition within the maximum resolution and the allowed length condition. The transcoder 107 creates the converted broadcasting program according to user's selection or automatically established condition. The converted broadcasting program like this can be freely copied and used in a user terminal without encryption.

Figure 6:
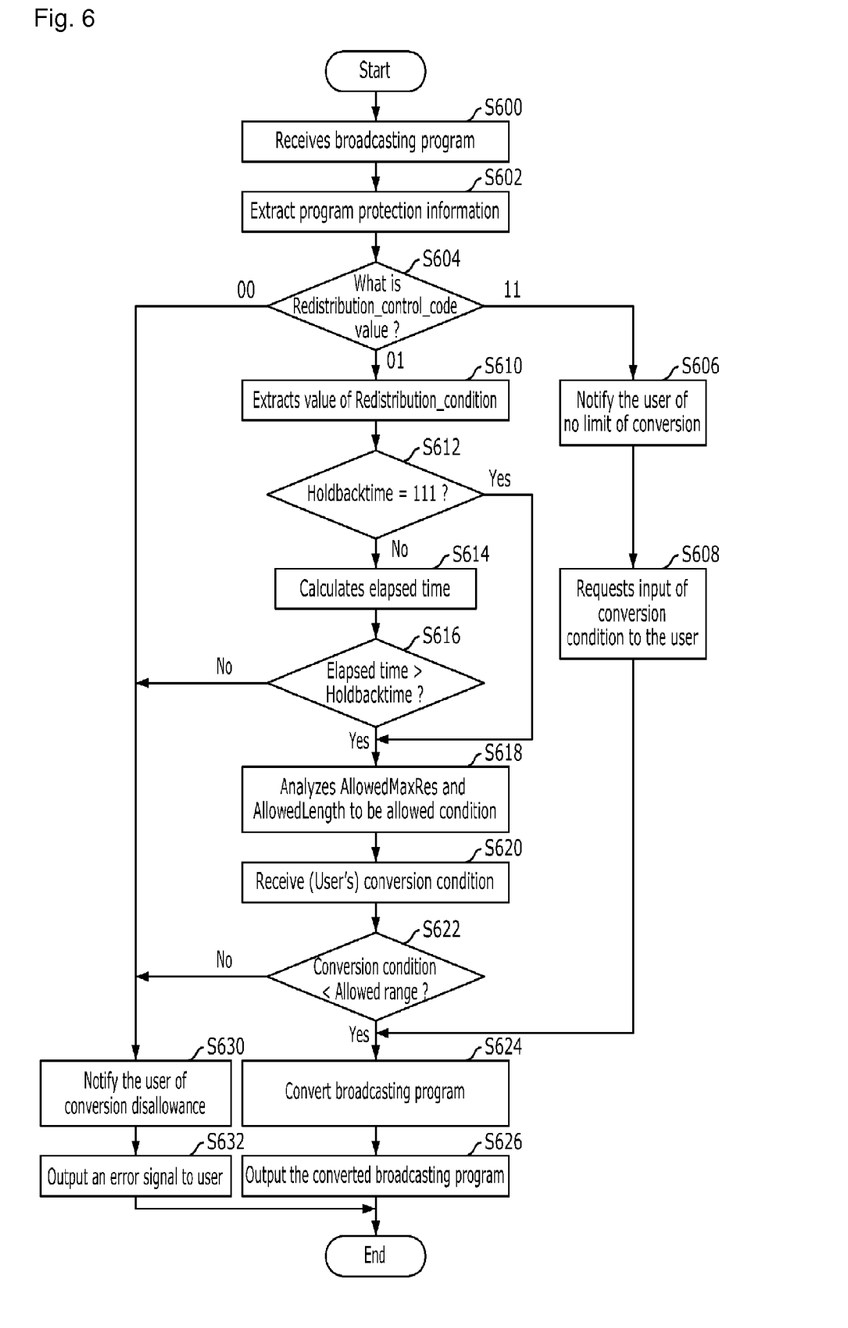
FIG. 6 is a flowchart describing a conversion process according to redistribution condition of program protection information in accordance with an embodiment of the present invention.

FIG. 6 is a flowchart describing a conversion process according to redistribution condition of program protection information in accordance with an embodiment of the present invention.

First, a receiver 100 receives broadcasting program through a tuner 101 at step S600. Then, the tuner 101 provides the received broadcasting program to a storage 106 and a demultiplexer 102 at the same time. Then, the demultiplexer 102 demultiplexes the broadcasting program and provides the demultiplexed broadcasting program to a decoder 103 and a PPI extractor 105. Here, the PPI extractor 105 extracts program protection information at step S602. The extracted protection information is provided to the storage 106 and a transcoder 107 at the same time. Therefore, the transcoder 107 stores the extracted protection information. When output of the broadcasting program is requested by the user, the storage 106 proceeds to step S604 to check Redistribution_control_code value. The transcoder 107 proceeds to step S630 when a value of Redistribution_control_code is "00". The transcoder 107 proceeds to step S610 when value of Redistribution_control_code is "01". The transcoder 107 proceeds to step S606 when value of Redistribution_control_code value is "11".

First, when the value of Redistribution_control_code is "11", there is no limitation on distribution as mentioned above. Therefore, the transcoder 107 proceeds to step S606 to notify the user that there is no limit on conversion of the broadcasting program. The transcoder 107 proceeds to step S608 and requests input of conversion condition to the user. Then, the transcoder 107 proceeds to step S624. Process of step S624 will be described next.

In the meantime, when the value of Redistribution_control_code is "00", conversion of the broadcasting program is not allowed. The transcoder 107 proceeds to step S630 to notify the user that the conversion of broadcasting program is disallowable. Then the transcoder 107 proceeds to step S632 and outputs an error signal to user through monitor or TV screen, and the like.

Finally, when the value of Redistribution_control_code is "01", it is able to distribute according to condition. The transcoder 107 extracts the value of Redistribution_condition at step S610. The transcoder 107 determines whether Holdbacktime value is "111" or not at S612. When the value of Holdbacktime is "111", that is, distribution is available regardless of time, the transcoder 107 proceeds to step S618. On the contrary, when the value of Holdbacktime is not "111", the transcoder 107 proceeds to step S614 to calculate the elapsed time. The elapsed time can be calculated by using the recording reference time and the current time. Then, the transcoder 107 proceeds to step S616 to determine whether the elapsed time exceeds Holdbacktime time. That is, the transcoder 107 determines whether a predetermined time defined in Holdbacktime passed. When the predetermined time passed, the transcoder 107 proceeds to step S618. Otherwise, the transcoder 107 proceeds to step S630.

When the transcoder 107 proceeds to step S618, the transcoder 107 analyzes allowed conditions, AllowedMaxRes and AllowedLength. That is, the transcoder 107 examines allowed maximum resolution and allowed maximum time. Then, the transcoder 107 receives the conversion condition inputted by the user at step S620, and determines whether the received conversion condition is within the allowed range at step S622. That is, if the conversion is requested under the condition equal to or less resolution than the allowed maximum resolution and the condition equal to or less time than the allowed length, the transcoder 107 proceeds to step S624 to convert the broadcasting program, because the allowed condition is satisfied. However, the transcoder 107 proceeds to step S630 when the allowed condition is not satisfied.

If the transcoder 107 proceeds to step S624 from step S622 or step S608, the transcoder 107 converts the broadcasting program stored in the storage 106, and proceeds to step S626 to output the converted broadcasting program.

As mentioned above, the transcoder 107 includes a counter or a clock that can confirm recording reference time and the current time to support HoldbackTime function explained above with reference to FIG. 3. If a user is able to change time of a system, e.g., a personal computer (PC), the time of the system may be changed by the user to satisfy allowed condition (HoldbackTime) without permission. To prevent the illegal change, the transcoder 107 can have a time synchronization module (not shown in FIG. 1). The time synchronization module synchronizes time of the receiver 100 in accordance with according to environment as following two ways.

(1) In case of a receiver supporting Internet, the receiver establishes the current time of the receiver by time of a network time protocol (NTP) server through communication with time-server using NTP client.

(2) In the case of a digital television (DTV) reception terminal, the DTV reception terminal receives territorial TS time information, which is time information of territorial transport stream (TS) transmitted currently, and sets the current time based on the TS time.

After, the transcoder 107 synchronizes the current time in accordance to one of the above two ways; calculates Holdbacktime as mentioned above; and compares elapsed time with Holdbacktime.

If the synchronization is impossible temporarily while the transcoder 107 tries synchronization of the outside server or the territorial signal as mentioned above, for example, when Internet connection is impossible or when reception of TS or time information in TS is impossible, the transcoder 107 decides the current time based on "the recent synchronized time value+internal clock time". In this case, the transcoder 107 can establish internal clock allowable time by maximum 24 hours or 48 hours. If the internal clock time is unstable or revised by a user, the transcoder 107 can notify synchronization failure to the user and processes time condition comparison failure.

Figure 7:
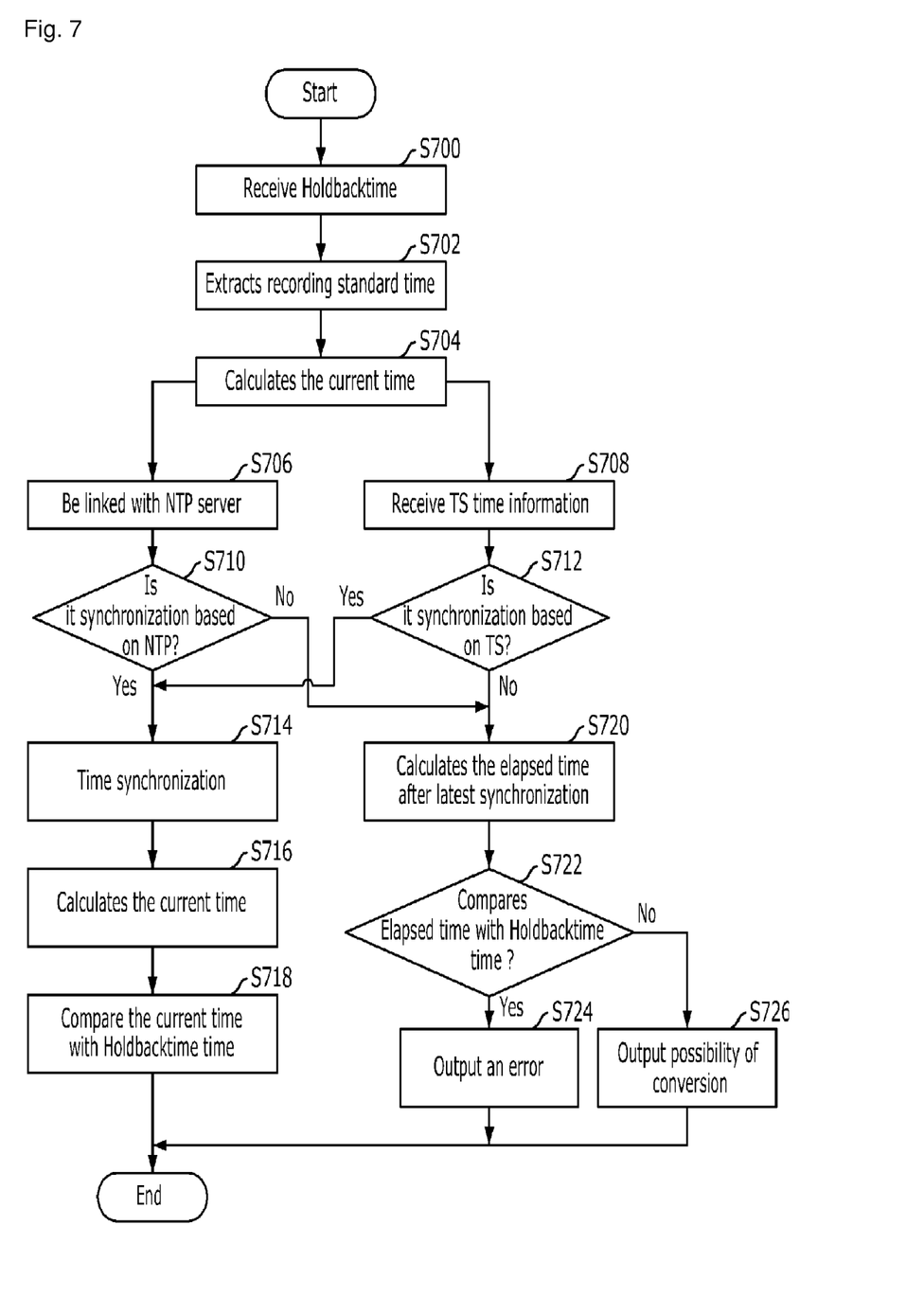
FIG. 7 is a flowchart describing time synchronization in apparatus for comparing time condition using Holdbacktime in accordance with one embodiment of the present invention.

FIG. 7 is a flowchart describing time synchronization in apparatus for comparing time condition using Holdbacktime in accordance with one embodiment of the present invention.

The transcoder 107 receives Holdbacktime value transferred from the PPI extractor 105 at step S700. The transcoder 107 proceeds to step S702 to extract recording reference time. Since, the transcoder 107 calculates the current time at step S704. Here, calculation of the current time can be embodied by various methods as mentioned above. Therefore, it is desirable to embody both of methods of calculating the current time. Accordingly, in FIG. 7, one embodiment that can accommodate both of two methods of calculating the current time is illustrated.

If the receiver 100 may receive TS time information, the transcoder 107 proceeds to step S708. If the receiver 100 may be link to a NTP server through the Internet, the transcoder 107 proceeds to step S706. First, a process using the NTP server will be described. If the receiver is linked to the NTP server, the transcoder 107 proceeds to step S710 to perform synchronization based on NTP. If time synchronization succeeds, the transcoder 107 proceeds to step S714. If not, the transcoder 107 proceeds to step S720. In addition, the receiver receives TS time information at step S708. If TS time information is received at step S712, the transcoder 107 proceeds to step 714. If not, the transcoder 107 proceeds to step S720.

First, when the process proceeds to step S714, the transcoder 107 performs time synchronization and calculates the current time at step S716. It is completed comparison process by comparing the current time with Holdbacktime time at step S718. While, when the process proceeds to step S720, the transcoder 107 calculates the elapsed time after latest synchronization and compares elapsed time with Holdbacktime time at step S722. In this embodiment, it is supposed that Holdbacktime is 48 hours. When 48 hours did not passed, the transcoder 107 proceeds to step S724 to output an error. When 48 hours passed, the transcoder 107 can notify a user of possibility on conversion of the broadcasting program at step S726.

Figure 8:
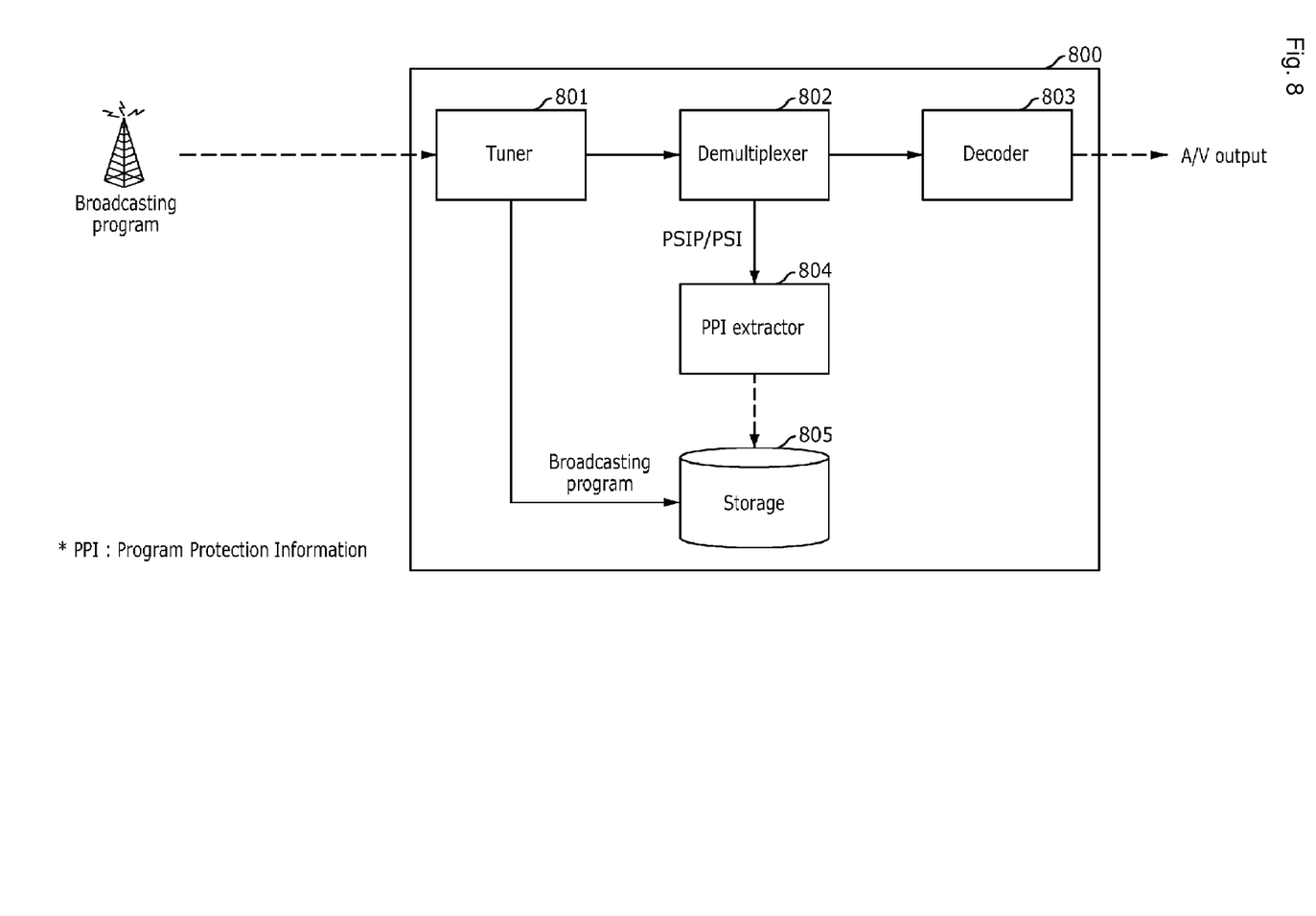
FIGS. 8 and 9 are diagrams illustrating separate receivers in accordance with another embodiment of the present invention.
Figure 9:
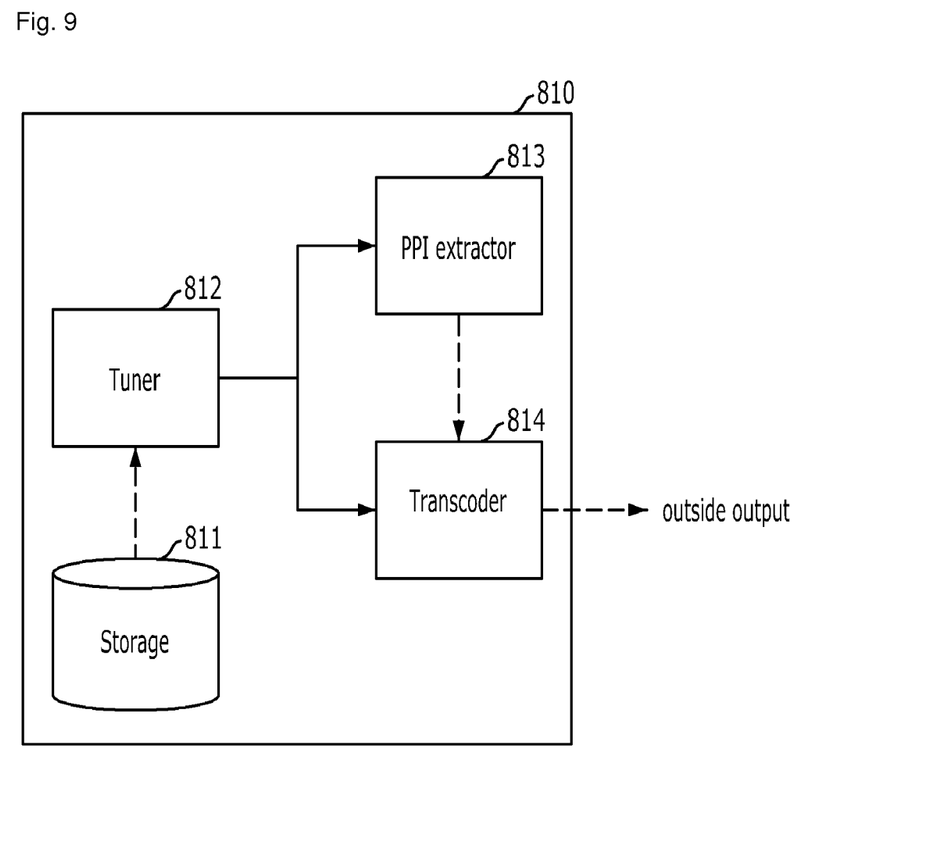

The receiver 100 illustrated in FIG. 1 can be embodied in another alternative structure, e.g., a conversion apparatus (or software) for converting the broadcasting program is separately embodied from a recording apparatus for recording the broadcasting program for conveniences sake of implementation. Referring to FIGS. 8 and 9, an embodiment in which the conversion apparatus is separately embodied from the recording apparatus will be described below.

FIGS. 8 and 9 are diagrams illustrating separate receivers in accordance with another embodiment of the present invention.

A reception recording apparatus 800 in FIG. 8 encrypts the broadcasting program based on PPI information and records the encrypted broadcasting program as a recorded file. A conversion apparatus 810 in FIG. 9 receives the recorded file, extracts PPI information again from the recorded file, and outputs the converted broadcasting program according to the above conversion control method.

Comparing FIG. 8 with FIG. 1, in the reception recording apparatus 800 in FIG. 8, the transcoder 107 is omitted from the receiver 100 in FIG. 1. That is, the reception recording apparatus 800 in FIG. 8 is possible to perform recordation, but impossible to perform conversion.

Referring to FIG. 9, a storage 811 may be the storage 805 of FIG. 8. That is, when the storage 805 of FIG. 8 is detachable in the reception recording apparatus 800, the storage 805 can be attached to the conversion apparatus in FIG. 9.

Since the conversion apparatus 810 Of FIG. 9 should verify conversion condition in a transcoder 814 based on the PPI information as mentioned above, the conversion apparatus needs a PPI extractor 813. The conversion apparatus 810 provides the transcoder 814 or a PPI extractor 813 with information stored (recorded) in the storage 811 through a tuner 812. Accordingly, the tuner 812 performs an interface with the storage 811. The tuner 812 should be embodied to provide data to the PPI extractor 813 and the transcoder 814.

A module described in this specification refers to a unit, which represents an apparatus of performing a particular function or an action. The module can be embodied by hardware, software or combination of software and hardware.

The above-mentioned apparatus and system may be implemented as hardware, software or combination thereof. In the case of the hardware implementation, the modules used for recording the broadcasting program may be implemented with one or more of application-specific integrated circuits (ASIC), digital signal processors (DSP), digital signal processing devices (DSPD), programmable logic devices (PLD), field programmable gate arrays (FPGA), processors, controllers, microcontrollers, microprocessors, other electronic units designed to execute the above-mentioned functions and combination thereof. Software may be implemented by the modules executing the above-mentioned functions. The software codes may be stored in memory units and executed by processors. The memory units may be implemented inside or outside the processors. In this case, the memory units may be connected to the processors through various known devices.

Meanwhile, the method of the present invention described above may be programmed for a computer. Codes and code segments constituting the computer program may be easily inferred by a computer programmer of ordinary skill in the art to which the present invention pertains. The computer program may be stored in a computer-readable recording medium, i.e., data storage, and it may be read and executed by a computer to realize the method of the present invention. The recording medium includes all types of computer-readable recording media, that is, it includes not only tangible media such as CD and DVD, but also intangible media such as carrier wave.

The present application contains a subject matter related to Korean Patent Application No. 10-2008-00103862, filed in the Korean Intellectual Property Office on Oct. 22, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. A method for controlling conversion of a broadcasting program based on program protection information in a receiver of the broadcasting program, the method comprising:
   demultiplexing the broadcasting program into broadcasting program data and program protection information;
   encrypting the broadcasting program data based on distribution condition of the program protection information when recordation of the broadcasting program data is requested; and
   recording the encrypted broadcasting program data,
   wherein the program protection information includes redistribution_control_code,
   wherein the broadcasting program data is encrypted based on the redistribution_control_code,
   wherein the encrypted broadcasting program data is recorded based on the redistribution_control_code,
   wherein the broadcasting program data is converted, reproduced, and distributed based on the redistribution_control_code by a user's requirement.

2. The method of claim 1, wherein the program protection information is based on a Redistribution Control (RC) descriptor of Advanced Television Systems Committee (ATSC).

3. The method of claim 2, wherein conversion of the broadcasting program data is decided based on control code included in the RC Descriptor of ATSC or not.

4. The method of claim 3, wherein the control code includes the redistribution_control_code.

5. The method of claim 1, further comprising:
   comparing redistribution condition of the program protection information with the user's requirement, when redistribution of the recorded broadcasting program that is encrypted is requested by the user;
   converting the recorded broadcasting program based on the user's requirement, thereby generating the converted broadcasting program, when the user's requirement is under the redistribution condition; and
   providing the converted broadcasting program.

6. The method of claim 5, wherein the redistribution condition includes a holdback time HoldbackTime; and
   wherein said converting the recorded broadcasting program is performed only when the current time is a redistribution time in which redistribution is permitted, the redistribution time is calculated based on the holdback time.

7. The method of claim 5, wherein the current time is calculated through time synchronization with an outside apparatus.

8. The method of claim 7, wherein the time synchronization with the outside apparatus is performed using a network time protocol (NTP).

9. The method of claim 7, wherein the time synchronization with the outside apparatus includes:
   receiving broadcasting program;
   extracting time information from the broadcasting program; and
   performing the time synchronization of the receiver based on the extracted time information.

10. The method of claim 5, wherein the redistribution condition includes an allowed maximum resolution condition; and
    wherein said converting the recorded broadcasting program is performed when user's resolution condition is under the allowed maximum resolution condition.

11. The method of claim 5, wherein the redistribution condition includes Maximum allowed length condition; and
    wherein said converting the recorded broadcasting program performs conversion of the recoded broadcasting program data, when redistribution is required from the user and the user's requirement is under Maximum allowed length.

12. An apparatus for controlling conversion of a broadcasting program based on program protection information, comprising:
    a demultiplexer configured to demultiplex the broadcasting program into broadcasting program data and program protection information;
    a storage configured to encrypt and record the broadcasting program data based on the program protection information, thereby generating a recorded broadcasting program; and
    a transcoder configured to convert and re-output the recorded broadcasting program based on the program protection information,
    wherein the program protection information includes redistribution_control_code, wherein the broadcasting program data is encrypted based on the redistribution_control_code, wherein the encrypted broadcasting program data is recorded based on the redistribution_control_code, wherein the broadcasting program data is converted, reproduced, and distributed based on the redistribution_control_code by a user's requirement.

13. The apparatus of claim 12, wherein the transcoder compares redistribution condition of the program protection information and the user's requirement, if the user's requirement is under the redistribution condition of the recorded broadcasting program, and converts the recorded broadcasting program based on the user's requirement.

14. The apparatus of claim 13, wherein the redistribution condition includes at least one of a holdback time, an allowed maximum resolution condition and an allowed maximum length, wherein the transcoder converts and outputs the recorded broadcasting program, when the user's requirement is under the redistribution condition of the program protection information.

15. The apparatus of claim 14, wherein the current time is calculated through time synchronization with an outside apparatus.

* * * * *